(12) United States Patent
Potoradi

(10) Patent No.: US 7,535,149 B2
(45) Date of Patent: May 19, 2009

(54) PERMANENT-MAGNET EXCITED SYNCHRONOUS MOTOR

(75) Inventor: Detlef Potoradi, Bad Neustadt/Saale (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/560,481

(22) PCT Filed: Jun. 2, 2004

(86) PCT No.: PCT/EP2004/005937

§ 371 (c)(1),
(2), (4) Date: Jun. 12, 2006

(87) PCT Pub. No.: WO2004/109894

PCT Pub. Date: Dec. 16, 2004

(65) Prior Publication Data

US 2007/0170802 A1  Jul. 26, 2007

(30) Foreign Application Priority Data

Jun. 10, 2003  (DE) ............... 103 26 167

(51) Int. Cl.
*H02K 19/00* (2006.01)
(52) U.S. Cl. .................. 310/162; 310/156.47
(58) Field of Classification Search ..............
310/156.01–156.84, 162
See application file for complete search history.

(56) References Cited

U.S. PATENT DOCUMENTS

| | | | |
|---|---|---|---|
| 5,220,228 A | 6/1993 | Sibata | |
| 5,323,077 A | 6/1994 | Brandes | |
| 6,664,690 B2* | 12/2003 | Huth | 310/156.57 |
| 7,067,948 B2* | 6/2006 | Yamaguchi et al. | 310/156.47 |
| 2002/0003382 A1 | 1/2002 | Nakano et al. | |

FOREIGN PATENT DOCUMENTS

| | | |
|---|---|---|
| EP | 0 409 661 | 1/1991 |
| EP | 0 545 060 | 4/1995 |
| JP | 3106869 U | 11/1991 |
| JP | 11069679 A | 3/1999 |
| JP | 2000 134893 | 5/2000 |
| JP | 2001339921 A | 12/2001 |

OTHER PUBLICATIONS

Zhu Z Q et al.: "Influcence of Design Parameters on Cogging Torque in Permanent Magnet Machines", IEEE Transactions of Energy Conversion, IEEE Inc. New York, US, vol. 15, No. 4, Dec. 1, 2000, pp. 407-412, XP002206342, ISSN: 0885-8969.

Jürgen Draeger, Meschede, "Reduzierung von Reluktanzmomenten",F&M 103, (1995) 7-8, Carl Hanser Verlag, Munich, pp. 433-436.

* cited by examiner

*Primary Examiner*—Nguyen N Hanh
(74) *Attorney, Agent, or Firm*—Henry M. Feiereisen; Ursula B. Day

(57) ABSTRACT

To reduce the torque ripple of permanent-magnet excited synchronous motors (1) having tooth coils (6), constructive means are proposed for damping or eliminating the fifth and/ or seventh harmonic wave of the rotor field which mainly cause torque ripple.

12 Claims, 2 Drawing Sheets

PERMANENT-MAGNET EXCITED SYNCHRONOUS MOTOR

BACKGROUND OF THE INVENTION

The invention relates to a permanent-magnet excited synchronous with tooth coils in a stator and with a rotor.

Permanent-magnet excited synchronous motors of a type involved here experience torque oscillations. A skew of the rotor or stator by a slot pitch, as described, for example, for conventional motors in EP 0 545 060 B1, cannot be used in electric motors with concentric winding, i.e., tooth coils and a small number of slots, because this would exceedingly reduce the torque.

In electric motors with conventional windings, i.e., windings fabricated in drawing technique and with a relatively large slot number, a skew of approximately one slot pitch is typically applied.

Attempts have been made to reduce torque oscillations in electric motors with tooth coils by constructing the magnets in a particular shape. A disadvantage associated therewith is however the increase in manufacturing costs to construct magnets with a particular shape.

SUMMARY OF THE INVENTION

The invention is therefore based on the object to provide an electric synchronous motor which is tailored to dampen or eliminate relevant harmonics in a simple manner so as to reduce torque oscillations or torque ripple.

The posed object is attained by a permanent magnet excited synchronous motor having tooth coils in the stator, and a rotor with structural means to dampen the fifth harmonic and/or the seventh harmonic of the rotor field.

The tooth coils form hereby at least a portion of a winding system of the permanent magnet excited synchronous motor, wherein the tooth coils have each only a single mechanical pole, i.e., a single tooth.

By applying a skew of half a slot pitch 0.5×Tn or a skew of ⅗×Tn, the fifth harmonic of the rotor field is completely eliminated. Tn hereby refers to a slot pitch.

A skew of 3/7×Tn eliminates the seventh harmonic of the rotor field.

Combining the skew of 60% of a slot pitch Tn with a pole coverage of 85% completely dampens or eliminates both the fifth and the seventh harmonic.

Combining the skew of 3/7×Tn with a pole coverage of approximately 80% also completely dampens or eliminates both the fifth and the seventh harmonic. Likewise, a pole coverage of 80%±10% also sufficiently dampens the fifth harmonic.

It is not required to apply the skew only to the rotor or only to stator; the effect of the skew, for example one half of a slot pitch, can be apportioned to the stator and rotor. For example, the stator can then assume half of the half slot pitch, and the rotor the remaining portion of the skew, to realize the desired skew.

BRIEF DESCRIPTION OF THE DRAWING

Other advantageous features of the invention will now be described with reference to an exemplified embodiment schematically depicted in the accompanying drawing in more detail. It is shown in.

DETAILED DESCRIPTION OF PREFERRED EMBODIMENTS

Figure 1:
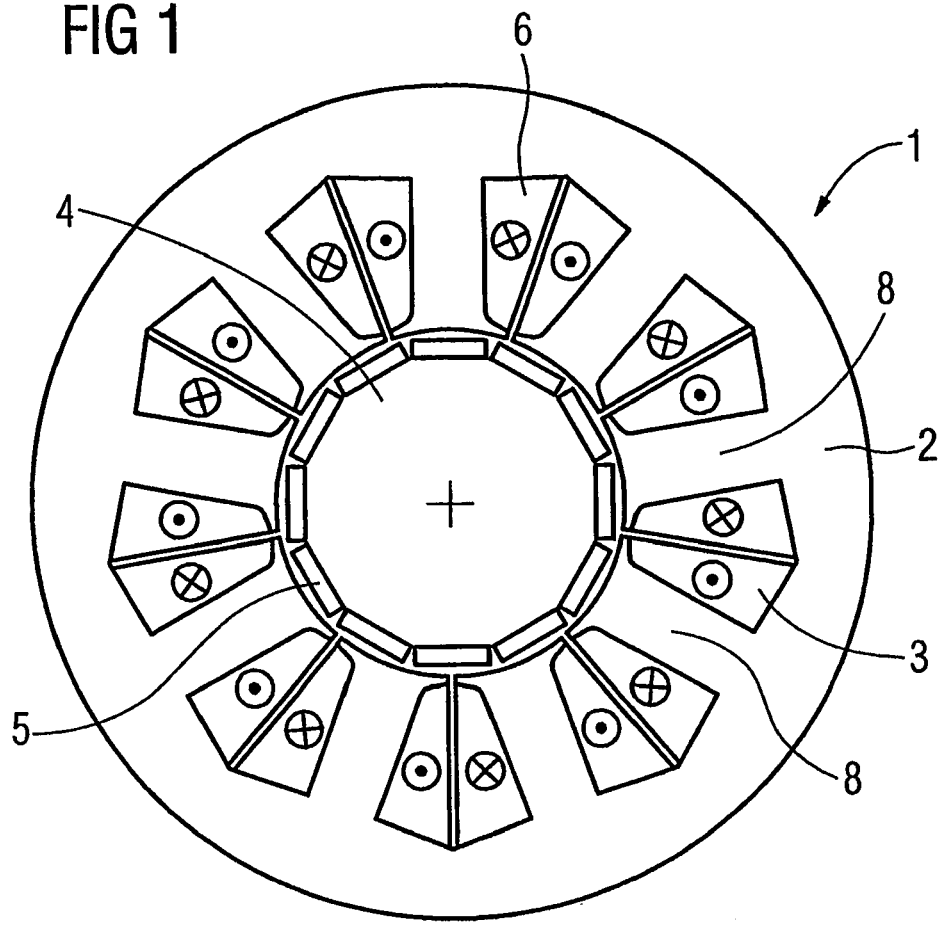
FIG. 1 a basic illustration of a machine according to the invention.

FIG. 1 shows a basic lamination piece of a permanent-magnet excited synchronous motor 1 with a stator 2 and a rotor 4. The number of pole pairs corresponds to one-third of the number of slots 3 of the stator 2. The number of teeth 8 is a multiple of 3, i.e., the phase number of the stator 2, and is suitably greater than or equal to nine. The stator 2 is made of laminated metal sheets which have slots 3 for insertion of the windings. The windings are, in particular, tooth coils 6, i.e., a tooth coil 6 includes only a single tooth 8. The rotor 4 is constructed of permanent magnets 5, which can be made of thin plates, rings or cup-shaped magnets. The permanent magnets 5 are magnetized or arranged in axial direction of the rotor 4 such as to provide the desired skew.

Figure 2:
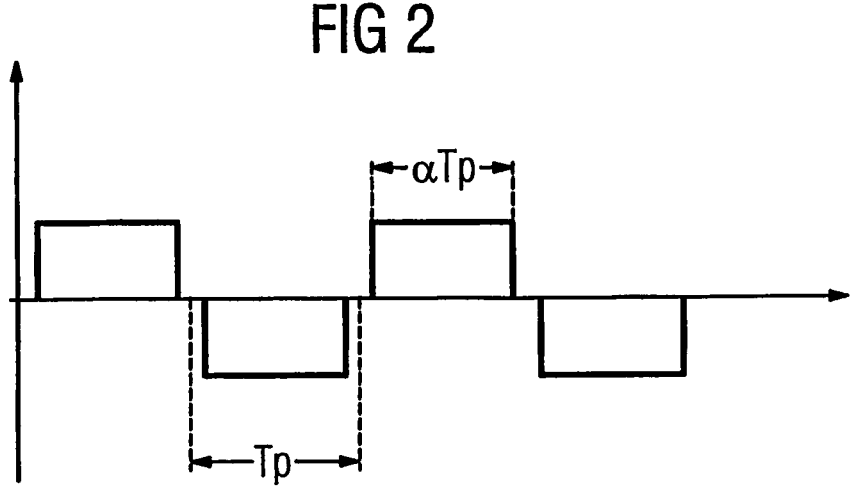
FIG. 2 a revolving magnetic field of an electric machine.

Such a rotor 4 generates in the air gap a revolving magnetic field shown in FIG. 2, which has the following course. Pole gaps are located between the poles. Tp is the pole pitch and a is the pole coverage factor which is typically in a range between 0.8 and 0.95. The smaller the pole coverage $\alpha$, the smaller the torque produced by the synchronous motor. $\alpha=1$ cannot be attained due to manufacturing constraints.

The basic revolving magnetic field shown in FIG. 2 has harmonics in addition to the fundamental wave. The fifth and seventh order harmonics are mainly relevant for the torque oscillations, which need to be damped or, if possible, eliminated completely. The height of these harmonics essentially depends on the pole coverage $\alpha$.

Figure 3:
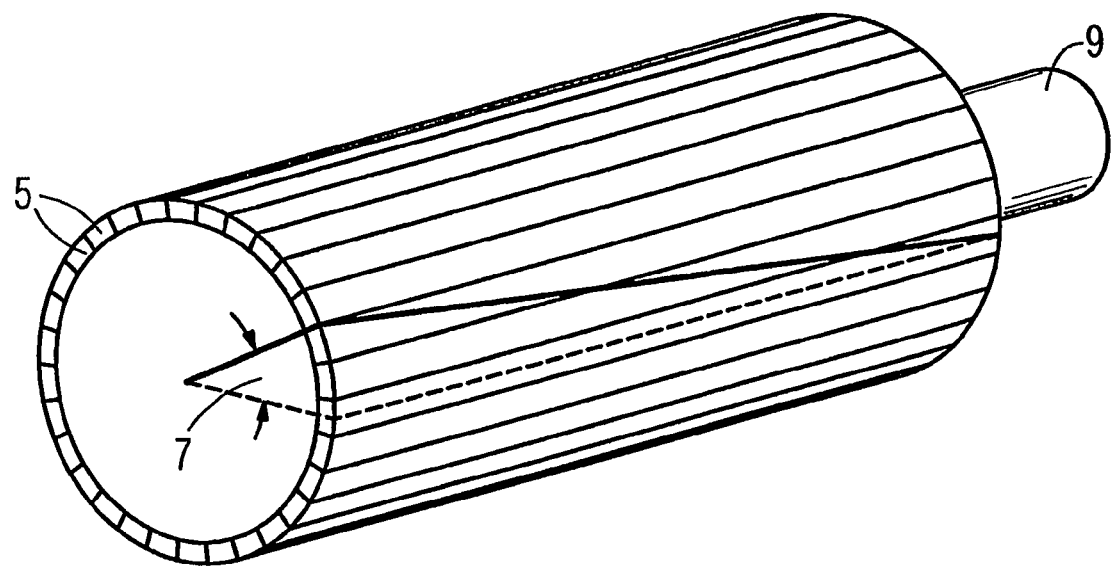
FIG. 3 a perspective view of a rotor according to the invention.

The torque oscillations can be damped by applying a skew to the rotor 4 and/or the stator 2. One measure for the skew is the skew angle 7 depicted in FIG. 3. Based on the skew angle 7, a skew factor can be defined which determines the damping of the various harmonics of the field in the air gap field. The skew of the stator 2 can optionally be obtained by a skewed arrangement of the slots 3 of the stator 2 in relation to the shaft 9.

According to the invention, the fundamental wave which generates the torque is only slightly damped while the relevant harmonics five and seven are eliminated. Both harmonics cause torque oscillations of the order 6p, i.e., 6p times the rotation frequency, wherein p is the number of pole pairs. An effective solution for preventing these torque oscillations is realized by applying a skew of half a slot pitch, i.e., Tn/2. The fifth harmonic is hereby damped to 19% and the seventh harmonic to 13.6%. At the same time, the most relevant cogging torque at twice the slot frequency is damped.

The fifth harmonic is =0, when a pole coverage is $\alpha=0.8$ or at least approximates 0.8. Then, only the seventh harmonic needs to be damped by the skew. This is achieved by making the skew smaller than half the slot pitch, namely exactly 3/7×Tn or 0.4285 Tn.

At a typical pole coverage of $\alpha=0.85$ or approximately 0.85 to 0.9, it is beneficial to damped in particular the fifth harmonic, so that the skew must be greater than half a slot pitch, namely ⅗×Tn. This skew results in a complete elimination of the fifth harmonic. The skew can be implemented in the rotor 4 as well as in the stator 2. Moreover, it is possible to apportion the required skew over the entire synchronous motor, i.e., both the rotor 4 and the stator 2 are provided with certain predeterminable portions of the overall required skew, so that the skews add up in the air gap and thus the same effect can be realized as if applying the skew only on the rotor 4 or the stator 2.

What is claimed is:

1. A permanent-magnet excited synchronous motor, comprising:
    a stator having a plurality of tooth coils; and
    a rotor with a plurality of poles interacting with the stator and constructed to dampen both the fifth harmonic and seventh harmonic of the rotor field,
    wherein at least one of the rotor and stator has a skew of $3/5$ of a slot pitch with respect to the synchronous motor, and
    wherein the rotor has a pole coverage of between 85% and 90% of the slot pitch.

2. The permanent-magnet excited synchronous motor of claim 1, wherein the rotor comprises a plurality of permanent magnets and the permanent magnets are arranged or magnetized in an axial direction of the rotor so as to provide a desired rotor skew.

3. The permanent-magnet excited synchronous motor of claim 2, wherein the permanent magnets are selected from the group consisting of thin plate magnets, ring-shaped magnets and cup-shaped magnets.

4. A permanent-magnet excited synchronous motor, comprising:
    a stator having a plurality of tooth coils, a slot pitch and
    a rotor with a plurality of poles interacting with the stator and constructed to dampen both the fifth harmonic and seventh harmonic of the rotor field,
    wherein at least one of the rotor and stator has a skew of $3/7$ of a slot pitch with respect to the synchronous motor, and
    wherein the rotor has a pole coverage of 80% (±10%) of the slot pitch.

5. The permanent-magnet excited synchronous motor of claim 4, wherein the rotor comprises a plurality of permanent magnets and the permanent magnets are arranged or magnetized in an axial direction of the rotor so as to provide a desired rotor skew.

6. The permanent-magnet excited synchronous motor of claim 5, wherein the permanent magnets are selected from the group consisting of thin plate magnets, ring-shaped magnets and cup-shaped magnets.

7. A permanent-magnet excited synchronous motor, comprising:
    a stator having a plurality of tooth coils, and
    a rotor disposed for rotation in the stator and having a pole coverage of between 85% and 90% of the slot pitch,
    wherein a total skew between the rotor and the stator of $3/5$ of slot pitch is apportioned to the stator and the rotor for damping the fifth harmonic and the seventh harmonic of the rotor field.

8. The permanent-magnet excited synchronous motor of claim 7, wherein the rotor comprises a plurality of permanent magnets and the permanent magnets are arranged or magnetized in an axial direction of the rotor so as to provide a desired portion of the total skew.

9. The permanent-magnet excited synchronous motor of claim 8, wherein the permanent magnets are selected from the group consisting of thin plate magnets, ring-shaped magnets and cup-shaped magnets.

10. A permanent-magnet excited synchronous motor, comprising:
    a stator having a plurality of tooth coils, a slot pitch and
    a rotor disposed for rotation in the stator and having a pole coverage of 80% (±10%) of the slot pitch,
    wherein a total skew between the rotor and the stator of $3/7$ of slot pitch is apportioned to the stator and the rotor for damping the fifth harmonic and the seventh harmonic of the rotor field.

11. The permanent-magnet excited synchronous motor of claim 10, wherein the rotor comprises a plurality of permanent magnets and the permanent magnets are arranged or magnetized in an axial direction of the rotor so as to provide a desired portion of the total skew.

12. The permanent-magnet excited synchronous motor of claim 11, wherein the permanent magnets are selected from the group consisting of thin plate magnets, ring-shaped magnets and cup-shaped magnets.

* * * * *

UNITED STATES PATENT AND TRADEMARK OFFICE
CERTIFICATE OF CORRECTION

PATENT NO. : 7,535,149 B2  Page 1 of 1
APPLICATION NO. : 10/560481
DATED : May 19, 2009
INVENTOR(S) : Detlef Potoradi It is certified that error appears in the above-identified patent and that said Letters Patent is hereby corrected as shown below:

Column 3:
Claim 4, line 3: delete "a slot pitch";

Column 4:
Claim 7, line 3: after "coils," insert --a slot pitch--;

Claim 7, line 7: before "slot" insert --the--;

Claim 10, line 7: before "slot" insert --the--.

Signed and Sealed this

Sixteenth Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,535,149 B2  
APPLICATION NO. : 10/560481  
DATED : May 19, 2009  
INVENTOR(S) : Detlef Potoradi Page 1 of 1

It is certified that error appears in the above-identified patent and that said Letters Patent is hereby corrected as shown below:

Column 3:  
Claim 4, line 29: delete "a slot pitch";

Column 4:  
Claim 7, line 7: after "coils," insert --a slot pitch--;

Claim 7, line 11: before "slot" insert --the--;

Claim 10, line 29: before "slot" insert --the--.

This certificate supersedes the Certificate of Correction issued June 16, 2009.

Signed and Sealed this

Fourteenth Day of July, 2009

JOHN DOLL  
*Acting Director of the United States Patent and Trademark Office*